UNITED STATES PATENT OFFICE 2,349,899

PRODUCTION OF AZO DYESTUFFS

Bernd v. Bock, Ludwigshafen-on-the-Rhine, Germany, assignor to General Aniline & Film Corporation, a corporation of Delaware No Drawing. Application July 13, 1939, Serial No. 284,248. In Germany July 28, 1938

5 Claims. (Cl. 260—155)

The present invention relates to azo dyestuffs.

I have found that valuable new azo dyestuffs, especially suitable for dyeing cellulose esters and ethers, are obtained by coupling diazotized aromatic amines free from from carboxylic and sulfonic acid groups with N-arylaminocarboxylic acid hydroxyalkyl esters capable of coupling, of the formula

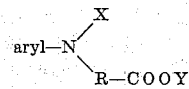

in which X is hydrogen or an alkyl, cycloalkyl, aralkyl or aryl radical, R is an alkylene radical which may also be substituted and Y is an alkyl group containing at least one free hydroxyl group.

The term "alkyl radical" comprises not only the radicals of aliphatic hydrocarbons such as methyl, ethyl, propyl, butyl or amyl radicals, and the like, but also substituted alkyl radicals, such as alkyl radicals substituted by hydroxy groups, keto groups, carboxylic acid groups, esterified carboxylic acid groups, etherified hydroxy groups, acid amide groups, the nitrile group or sulfocyanide group.

Suitable N-arylamino carboxylic acid hydroxyalkyl esters of the said kind are obtained for example by adding on alkylene oxides, such as ethylene oxide, propylene oxide or epichlorhydrin, to the corresponding arylamino carboxylic acids or by the reaction of salts of the said acids with halogen hydrins, such as ethylene chlorhydrin or glycerine chlorhydrin. There may be mentioned for example N-phenylaminoacetic acid-beta-hydroxyethyl ester, beta-N-phenylaminopropionic acid-beta'-hydroxyethly ester, or -beta'-gamma'-dihydroxypropyl ester, beta-N-phenylamino-alpha-methylpropionic acid-beta'-hydroxy-ethyl ester, beta-N-(3-methylphenyl)-aminopropionic acid-beta'-hydroxyethyl ester and N-phenylaspartic acid-di(beta'-hydroxyethyl)-ester. Suitable tertiary arylaminocarboxylic acid hydroxyalkyl esters are for example N-methyl-N-phenylaminoacetic acid-beta'-hydroxyethyl ester, N-beta'-hydroxyethyl-N-phenylaminoacetic acid-beta''-hydroxyethyl ester, beta-N-methyl-N- phenylaminopropionic acid-beta'-hydroxyethyl ester, beta-N-ethyl-N-phenylaminopropionic acid-beta', gamma'-dihydroxypropyl ester, beta-N-methyl-N-(2-methylphenyl)-aminoproprionic acid-beta'-hydroxyethyl ester, beta-N-beta'-hydroxyethyl - N - (3-methylphenyl) - aminopropionic acid-beta''-hydroxy-gamma''-chloropropyl ester, the beta'-hydroxyethyl esters of beta-N-beta'-cyanethyl-N-(3-methylphenyl)-aminopropionic acid, beta-N-butyl - N - (2 - methoxy-5-methylphenyl)-aminopropionic acid, beta-N-butyl-N-(2.5-dimethoxyphenyl)-aminopropionic acid, beta-N-ethyl-N-(3-chlorphenyl)-aminopropionic acid, beta-N-benzyl-N-phenylaminopropionic acid, beta-N-cyclohexyl-N-phenylaminopropionic acid, beta-N-diphenylaminopropionic acid, and also N-N-dicarboxyethylaminobenzene-di-(beta'-hydroxyethyl) ester:

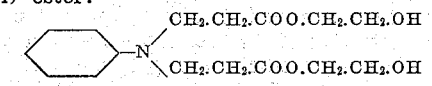

beta - N - ethyl - N - (3 - methylphenyl) - aminopropionic acid - beta' - hydroxyethoxyethyl ester:

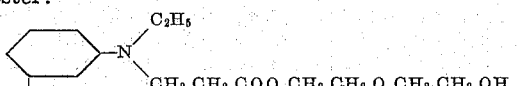

beta - N - ethyl - N - (3 - methylphenyl) - aminopropionic acid - hydroxy - (polyethoxy) - ethyl esters:

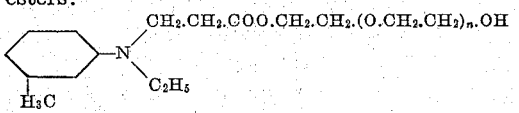

(in which $n$ is a whole number of for example 2 to 20), N-ethyl-N-phenylaspartic acid-di-(beta'-hydroxyethyl) ester, N-hydroxyethyl-N-(3-methylphenyl)-aspartic acid-di - (beta' - hydroxyethyl) ester.

Suitable coupling components are also N-alkyl-N-aryl-aminopropionic acids in which the alkyl radical consists of a chain of a number of methylene groups attached to the aryl nucleus, as in the beta'-hydroxyalkyl esters of N-beta-carboxyethyl-1.2.3.4.-tetrahydroquinoline, as for example:

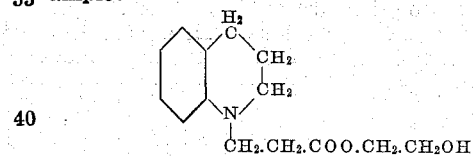

and its substitution products.

As diazo components there are used aromatic amines without carboxylic or sulfonic acid groups usual for the preparation of azo dyestuffs, as for example aminobenzene, 2-chlor-1-aminobenzene, 1-aminobenzene-4-carboxylic acid methyl ester, 1-aminophenyl-4-methylsulfone, 4 - aminoacetophenone, 2-aminobenzothiazole and 1-aminonaphthalene. The diazo compounds of 4-nitroarylamines are especially suitable, as for example those from 1-amino-4-nitrobenzene, 1-amino-2-chlor-4-nitrobenzene, 1-amino-2.6-dichlor-4-nitrobenzene, 1-amino-2.4-dinitro - 6 - bromobenzene,, 1-amino-2.4-dinitro-6-cyanobenzene, and 1-amino-2-hydroxy - 4 - nitrobenzene. Aromatic amines which already contain an azo group may also be used as diazo components, as for example 4-aminoazobenzene, valuable disazo dyestuffs thus being obtained.

A further possibility for preparing the new azo dyestuffs consists in starting with azo dyestuffs corresponding to the above composition but in which a free carboxylic acid group is contained instead of the esterified carboxylic acid group, and then converting the said group into an ester group containing a hydroxyl group. This may be effected for example by reacting such azo dyestuff carboxylic acids with an alkylene oxide, or reacting a salt of such an acid with a chlorhydrin.

The new azo dyestuffs are especially suitable for dyeing cellulose esters and ethers for which they have an excellent penetrating power. Clear dyeings of excellent fastness to light are obtained. If the dyestuffs are dispersed with suittable dispersing agents, colloidal solutions in water are obtained which behave like true solutions; the solutions are entirely clear and may be filtered without leaving behind any residue. They have an excellent dyeing-through power for closely woven acetate artificial silk fabrics and strongly twisted acetate artificial silk yarns. Contrasted with the acetate artificial silk dyestuffs which are truly soluble in water, the new dyestuffs are distinguished by the valuable property of dyeing just as powerfully from dilute dyebaths as from concentrated dyebaths. The new dyestuffs are also suitable for the preparation of colored coatings with the aid of spirit lacquers, varnish lacquers, and also for coloring fats, oils and waxes.

The following examples will further illustrate how this invention may be carried out in practice but the invention is not restricted to these examples. The parts are by weight.

Example 1

A diazonium solution prepared from 209 parts of 1-amino-2.6-dichlor-4-nitrobenzene is added to a solution of 265 parts of beta-N-ethyl-N-(3-methylphenyl)-aminopropionic acid - beta' - hydroxyethyl ester in 110 parts of 36 per cent hydrochloric acid and 2000 parts of water. The azo dyestuff forms very rapidly. It is pressed off and dried at 60° C. If it be kneaded or otherwise dispersed with a suitable dispersing agent, as for example the condensation product of cresol-formaldehyde resin and 2-hydroxynaphthalene-6-sulfonic acid-1-homophthalide, the dyestuff is obtained in the form of a dark brown powder which gives a clear solution in water which can be filtered without leaving a residue. Acetate artificial silk is dyed powerful red-brown, very fast shades from an aqueous dyebath after the addititon of crystallized sodium sulfate.

Example 2

A diazonium solution prepared in the usual way from 138 parts of 1-amino-4-nitrobenzene is added to a solution of 345 parts of a compound obtained by the reaction of beta-N-ethyl-N-(3-methylphenyl)-aminopropionic acid and 3 molecular proportions of ethylene oxide (probable formula:

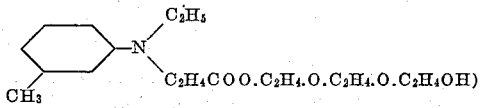

in 110 parts of 36 per cent hydrochloric acid and 2000 parts of water. After coupling is completed, the dyestuff is pressed off and dried at 60° C. It dyes acetate artificial silk red shades from an aqueous bath.

Example 3

A diazonium solution from 172 parts of 1-amino - 2 - chlor - 4 - nitrobenzene is added while stirring to a solution of 365 parts of N-N-di-(beta-carboxyethyl)-1-amino-3-methylbenzene-di-(beta'-hydroxyethyl) ester in 110 parts of 36 per cent hydrochloric acid and 2000 parts of water. The azo dyestuff is very soon completely formed. It is pressed off and dried at 60° C. Ruby-red shades are obtained therewith on acetate artificial silk. Spirit and varnish lacquers may be colored therewith; they yield blue-red coatings. Stearin masses, paraffin wax or vegetable waxes are colored red.

Example 4

A diazonium solution prepared from 180 parts of 2-amino-6-methoxybenzothiazole is added to a solution of 300 parts of beta-N-ethyl-N-(3-methylphenyl)-aminopropionic acid-beta'-gamma'-dihydroxypropyl ester in 120 parts of 32 per cent hydrochloric acid and 2000 parts of water. The coupling is very rapidly completed. The resulting dyestuff is pressed off and dried. It dyes acetate artificial silk very clear rose-red shades. Spirit and varnish lacquers yield red coatings with the dyestuff.

In the following table there are given some further combinations and the shade of the dyestuffs on acetate artificial silk.

| | Diazo component | Coupling component | Shade of the dyestuff on acetate artificial silk |
|---|---|---|---|
| 1 | NH₂–C₆H₃–Cl | C₆H₅–N(C₂H₅)(CH₂.CH₂.COOC₂H₄OH) | Yellow. |
| 2 | NH₂–C₆H₃–NO₂ | (CH₃)(CH₃)C₆H₃–N(CH₂.CH₂.COOC₂H₄OH) | Orange. |
| 3 | NH₂–C₆H₄–COOC₂H₅ | ----do---- | Do. |

| | Diazo component | Coupling component | Shade of the dyestuff on acetate artificial silk |
|---|---|---|---|
| 4 | NH₂–⌬–COCH₃ | C₂H₅, CH₃–⌬–N(CH₂.CH₂.COOCH₂.CHOH.CH₂OH) | Orange. |
| 5 | NH₂–⌬–N=N–⌬– | C₂H₅, CH₃–⌬–N(CH₂.CH₂.COOC₂H₄OH) | Scarlet. |
| 6 | H₃CO–⌬–(N=C.NH₂, S) | ...do... | Pink. |
| 7 | ...do... | C₂H₄OH, CH₃–⌬–N(CH₂.CH₂.COOC₂H₄OH) | Do. |
| 8 | ...do... | C₂H₅, ⌬–N(CH₂.CH₂.COOCH₂.CHOHCH₂OH) | Red. |
| 9 | NH₂–⌬–NO₂ | ⌬–NHCH₂.COOC₂H₄OH | Do. |
| 10 | ...do... | ⌬–NH.CH₂.CH₂.COOC₂H₄OH | Orange-red. |
| 11 | ...do... | C₂H₅, CH₃–⌬–N(CH₂.CH₂.COOCH₂.CHOH.CH₂OH) | Red. |
| 12 | ...do... | CH₂.CHOH.CH₂OH, ⌬–N(CH₂.CH₂.COOCH₂.CHOH.CH₂OH) | Red-orange. |
| 13 | ...do... | CH₂.CH₂.COOH, CH₃–⌬–N(CH₂.CH₂.COOH) +6 mols ethyleneoxide | Dull red. |
| 14 | ...do... | C₄H₉, CH₃–⌬–N(CH₂.CH₂.COOC₂H₄OH) | Do. |
| 15 | ...do... | C₂H₅, CH₃–⌬–N(CH₂.CH₂.COOH) +5 mols ethyleneoxide | Pale red. |
| 16 | ...do... | OCH₃, C₄H₉, CH₃–⌬–N(CH₂.CH₂.COOC₂H₄OH) | Dull claret-red. |

| | Diazo component | Coupling component | Shade of the dyestuff on acetate artificial silk |
|---|---|---|---|
| 17 | 2-amino-5-nitro-toluene (NH₂, CH₃, NO₂) | phenyl-N(C₂H₅)(CH₂.CH₂.COOC₂H₄OH), CH₃ | Red. |
| 18 | 2-amino-4-nitro-chlorobenzene (NH₂, Cl, NO₂) | phenyl-N(CH₃)(CH₂.CH₂.COOC₂H₄OH) | Claret-red. |
| 19 | ....do.... | phenyl-N(C₂H₅)(CH₂.CH₂.COOH), CH₃ +3 mols ethyleneoxide | Bright ruby-red. |
| 20 | ....do.... | phenyl-N(CH₂.CH₂.COOH)(CH₂.CH₂.COOH), CH₃ +4 mols ethylene oxide | Do. |
| 21 | 2-amino-4-nitro-phenol (NH₂, OH, NO₂) | phenyl-N(CH₃)(CH₂.CH₂.COOC₂H₄OH), CH₃ | Pink. |
| 22 | 2-amino-4-nitro-anisole (NH₂, OCH₃, NO₂) | phenyl-N(C₂H₅)(CH₂.CH₂.COOC₂H₄OH) | Claret-red. |
| 23 | ....do.... | phenyl-N(CH₃)(CH₂.CH₂.COOC₂H₄OH), CH₃ | Blue-red. |
| 24 | 2-amino-3,5-dinitro (NH₂, NO₂, NO₂) | phenyl-N(C₂H₅)(CH₂.CH₂.COOC₂H₄OH), CH₃ | Ruby-red. |
| 25 | 2-amino-3,5-dichloro-4-nitro (Cl, NH₂, Cl, NO₂) | phenyl-N(CH₃)(CH₂.CH₂.COOC₂H₄OH) | Yellow-brown. |
| 26 | ....do.... | phenyl-N(CH₃)(CH₂.CH₂.COOC₂H₄OH), CH₃ | Red-brown. |
| 27 | 2-amino-3-nitro-5-bromo... (Br, NH₂, NO₂, NO₂) | phenyl-N(C₄H₉)(CH₂.CH₂.COOC₂H₄OH), CH₃ | Blue-violet. |

What I claim is:

1. Azo dyestuffs corresponding to the general formula

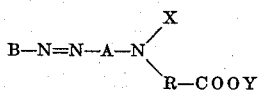

wherein A stands for a monocyclic radical of the benzene series free from sulfonic and carboxylic acid groups, wherein B stands for a radical free from sulfonic and carboxylic acid groups selected from the group consisting of radicals of the benzene, naphthalene and benzothiazole series, wherein X stands for a member of the group consisting of hydrogen, alkyl, cycloalkyl, aralkyl and phenyl and a chain of several methylene groups connected with the radical A so as to form a tetrahydroquinoline nucleus, wherein R stands for an alkylene radical, and wherein Y stands for an alkyl radical containing at least one free hydroxy group.

2. Azo dyestuffs corresponding to the general formula

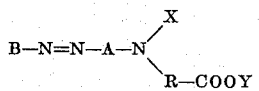

wherein A stands for a monocyclic radical of the benzene series free from sulfonic and carboxylic acid groups, wherein B stands for a monocyclic radical of the benzene series free from sulfonic and carboxylic acid groups containing at least one nitro group, wherein X stands for a member of the group consisting of hydrogen, alkyl, cycloalkyl, aralkyl and phenyl and a chain of several methylene groups connected with the radical A so as to form a tetrahydroquinoline nucleus, wherein R stands for an alkylene radical, and wherein Y stands for an alkyl radical containing at least one free hydroxy group.

3. Azo dyestuffs corresponding to the general formula

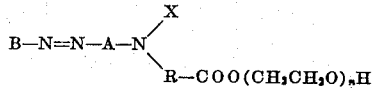

wherein A stands for a monocyclic radical of the benzene series free from sulfonic and carboxylic acid groups, wherein B stands for a monocyclic radical of the benzene series free from sulfonic and carboxylic acid groups containing at least one nitro group, wherein X stands for a member of the group consisting of hydrogen, alkyl, cycloalkyl, aralkyl and phenyl and a chain of several methylene groups connected with the radical A so as to form a tetrahydroquinoline nucleus, wherein R stands for an alkylene radical, and wherein $n$ stands for a whole number.

4. Azo dyestuffs corresponding to the general formula

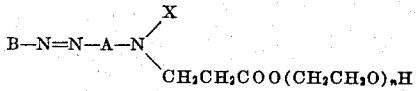

wherein A stands for a monocyclic radical of the benzene series free from sulfonic and carboxylic acid groups attached to the azo group shown in para-position with reference to the amino group shown, wherein B stands for a monocyclic radical of the benzene series free from sulfonic and carboxylic acid groups containing at least one nitro group, wherein X stands for a member of the group consisting of hydrogen, alkyl, cycloalkyl, aralkyl and phenyl and a chain of several methylene groups connected with the radical A so as to form a tetrahydroquinoline nucleus, and wherein $n$ stands for a whole number.

5. Azo dyestuffs corresponding to the general formula

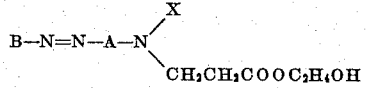

wherein A stands for a monocyclic radical of the benzene series free from sulfonic and carboxylic acid groups attached to the azo group shown in para-position with reference to the amino group shown, wherein B stands for a monocyclic radical of the benzene series free from sulfonic and carboxylic acid groups containing at least one nitro group and wherein X stands for a lower alkyl radical.

BERND v. BOCK.